US009863652B2

(12) United States Patent
Kamoshida et al.

(10) Patent No.: US 9,863,652 B2
(45) Date of Patent: Jan. 9, 2018

(54) HEAT EXCHANGER WITH THERMAL STORAGE FUNCTION

(71) Applicant: KEIHIN THERMAL TECHNOLOGY CORPORATION, Oyama-shi (JP)

(72) Inventors: Osamu Kamoshida, Oyama (JP); Mitsuru Nobusue, Oyama (JP)

(73) Assignee: KEIHIN THERMAL TECHNOLOGY CORPORATION, Oyama-Shi (JP)

( * ) Notice: Subject to any disclaimer, the term of this patent is extended or adjusted under 35 U.S.C. 154(b) by 384 days.

(21) Appl. No.: 14/526,525

(22) Filed: Oct. 29, 2014

(65) Prior Publication Data

US 2015/0121945 A1    May 7, 2015

(30) Foreign Application Priority Data

Nov. 1, 2013    (JP) .................................. 2013-228168

(51) Int. Cl.
F25D 11/00 (2006.01)
F25D 11/04 (2006.01)
(Continued)

(52) U.S. Cl.
CPC ............ *F24F 5/0021* (2013.01); *B23P 15/26* (2013.01); *F25B 39/022* (2013.01);
(Continued)

(58) Field of Classification Search
CPC ...... F25B 39/022; F25B 39/02; F25B 39/024; F25B 2400/24; F24F 5/0021; B23P 15/26;
(Continued)

(56) References Cited

U.S. PATENT DOCUMENTS 5,189,900 A * 3/1993 Colvin ................. B21D 53/085
29/890.044
5,379,830 A * 1/1995 Itoh ..................... F28D 15/0233
165/104.14
(Continued)

FOREIGN PATENT DOCUMENTS

JP    2011-012947    1/2011

*Primary Examiner* — Joseph Trpisovsky
(74) *Attorney, Agent, or Firm* — Mori & Ward, LLP

(57) ABSTRACT

A cylindrical hole is formed between peripheral belt portions of two container constituent plates of a thermal storage material container of an evaporator with a cool storage function. A cylindrical portion of a thermal storage material charging member having a thermal storage material charging passage is disposed in the cylindrical hole and brazed to the two container constituent plates. That portion of the thermal storage material charging member which protrudes from the cylindrical hole includes a crushed portion and a cylindrical uncrushed portion. The crushed portion seals the thermal storage material passage. The cylindrical portion of the thermal storage material charging member is smaller in outside diameter than the uncrushed portion, and the cylindrical portion and the uncrushed portion have the same inside diameter. The cylindrical portion has an inward protrusion protruding into a thermal storage material containing space, and the inward protrusion has a radially expanding engagement portion.

7 Claims, 7 Drawing Sheets

(51) Int. Cl.
*F25D 17/02* (2006.01)
*F25B 39/02* (2006.01)
*F24F 5/00* (2006.01)
*B23P 15/26* (2006.01)

(52) U.S. Cl.
CPC ......... *F25B 2400/24* (2013.01); *Y02E 60/147* (2013.01); *Y10T 29/49359* (2015.01)

(58) Field of Classification Search
CPC .. Y02E 60/147; Y10T 29/49359; F28F 1/025; F28F 1/06; F28F 1/08; F28F 23/00; F28D 1/0333; F28D 1/05391; F28D 20/02; F28D 2021/0085; F28D 2020/0013
USPC .......... 62/434, 430, 438, 515, 524; 165/152, 165/170
See application file for complete search history.

(56) References Cited

U.S. PATENT DOCUMENTS

| | | | | |
|---|---|---|---|---|
| 6,679,316 | B1* | 1/2004 | Lin | F28D 15/0233 165/104.26 |
| 7,841,386 | B2* | 11/2010 | Wang | F28D 15/0283 165/104.21 |
| 2006/0243424 | A1* | 11/2006 | Lin | B23P 15/26 165/104.21 |
| 2007/0089376 | A1* | 4/2007 | Wong | B23P 15/26 53/50 |
| 2010/0223949 | A1* | 9/2010 | Higashiyama | F25B 39/022 62/519 |
| 2010/0307180 | A1* | 12/2010 | Yamada | F25D 19/00 62/285 |
| 2011/0239696 | A1* | 10/2011 | Takagi | B60H 1/00335 62/524 |
| 2012/0285662 | A1* | 11/2012 | Meyer, IV | F28D 15/0283 165/104.26 |
| 2013/0086938 | A1* | 4/2013 | Higashiyama | B65D 7/42 62/524 |
| 2014/0251580 | A1* | 9/2014 | Geiger | F28D 1/0461 165/96 |

* cited by examiner

HEAT EXCHANGER WITH THERMAL STORAGE FUNCTION

BACKGROUND OF THE INVENTION

The present invention relates to a heat exchanger with a thermal storage function and to a method of manufacturing the same.

In order to protect the environment and improve fuel consumption of automobiles, there has been proposed an automobile designed to automatically stop the engine when the automobile stops, for example, to wait for a traffic light to change.

However, an ordinary car air conditioner has a problem in that, when an engine of an automobile in which the air conditioner is mounted is stopped, a compressor driven by the engine is stopped, and supply of refrigerant (medium to transport the cool) to an evaporator stops, whereby the cooling capacity of the air conditioner drops sharply.

As one measure to solve such a problem, imparting a cool storage function to the evaporator has been considered, to thereby enable cooling of a vehicle compartment by releasing the cool stored in the evaporator, when the compressor stops as a result of stoppage of the engine.

In a proposed evaporator with a cool storage function (see Japanese Patent Application Laid-Open (kokai) No. 2011-12947), a plurality of flat refrigerant flow tubes (heat exchanger tubes) which extend in the vertical direction and whose width direction coincides with an air-passing direction are disposed in parallel at intervals to thereby form clearances between the adjacent refrigerant flow tubes. Some of the clearances accommodate respective cool storage material containers in which a thermal storage medium for storing the cool; i.e., a cool storage material, is contained. The remaining clearances accommodate respective outer fins. Each of the cool storage medium containers is formed by joining two metal plates at their peripheral portions. The cool storage medium is contained in a cool storage medium containing space provided between the two metal plates.

Although not specified in the above publication, in order to contain the cool storage material in the cool storage material container, the cool storage material container must have a cool storage material charging inlet in the form of a cylindrical hole. After the cool storage material is charged into the cool storage material containing space through the cool storage material charging inlet, the cool storage material charging inlet must be closed.

Meanwhile, in the evaporator with a cool storage function described in the above publication, the cool storage material charging inlet in the form of a cylindrical hole is considered to be easily formed on the cool storage material container as follows. An outwardly protruding semicylindrical portion is provided at a peripheral portion of each of the metal plates. Outward flanges are provided at respective opposite side edges of each of the semicylindrical portions. In joining the metal plates, the corresponding outward flanges are joined together, thereby forming the cool storage material charging inlet. Also, the cool storage material charging inlet is considered to be easily closed by, after charge of the cool storage material, press-fitting a circular columnar plug into the cool storage material charging inlet.

Usually, in manufacture of the two metal plates used to form the above cool storage material container, two metal blank plates are subjected to pressing by use of two dies having shapes corresponding to the final shapes of the two metal plates, respectively. In this case, a clearance is unavoidably formed between the plug and the inner circumferential surface of the cylindrical hole formed by the semicylindrical portions of the two metal plates.

SUMMARY OF THE INVENTION

An object of the present invention is to provide a heat exchanger with a thermal storage function which can effectively restrain leakage of a thermal storage material from a thermal storage material container without use of a separately prepared plug.

To fulfill the above object, the present invention comprises the following modes.

1) A heat exchanger with a thermal storage function comprises a plurality of heat exchanger tubes, and a plurality of thermal storage material containers which are formed of metal and in which a thermal storage material is contained. Each of the thermal storage material containers comprises two container constituent plates formed of metal and joined together at their peripheral belt portions. At least one of the two container constituent plates bulges outward at a portion other than the joined peripheral belt portion to thereby form a thermal storage material containing space in each of the thermal storage material containers. Heat is transmitted to the thermal storage material contained in the thermal storage material containers from a medium flowing through the heat exchanger tubes and conveying heat. In the heat exchanger with a thermal storage function, the peripheral belt portions of the two container constituent plates of each of the thermal storage material containers are deformed outward to thereby form a cylindrical hole between the peripheral belt portions for allowing the thermal storage material containing space to communicate with the exterior thereof, and a portion of a thermal storage material charging member formed of metal and having a thermal storage material charging passage therein, the portion being located toward one longitudinal end of the thermal storage material charging member, is disposed within the cylindrical hole and is brazed to the two container constituent plates of the thermal storage material container. That portion of the thermal storage material charging member which resides within the cylindrical hole is cylindrical; that portion of the thermal storage material charging member which protrudes outward from the cylindrical hole is crushed from radially opposite sides at an outer end portion thereof, whereby a circumferential wall of the thermal storage material charging member is deformed to thereby form a crushed portion on the thermal storage material charging member for sealing the thermal storage material charging passage; and a cylindrical uncrushed portion is that portion of the thermal storage material charging member which protrudes outward from the cylindrical hole, excludes the crushed portion, and is located toward the thermal storage material container. That cylindrical portion of the thermal storage material charging member which resides within the cylindrical hole is smaller in outside diameter than the cylindrical uncrushed portion; the cylindrical portion is equal in inside diameter to the cylindrical uncrushed portion; the thermal storage material charging member has, at an inner end portion, an inward protrusion protruding into the thermal storage material containing space; and the inward protrusion has an engagement portion which expands radially outward.

2) A heat exchanger with a thermal storage function according to par. 1), wherein the cylindrical uncrushed portion of the thermal storage material charging member has a wall thickness of 0.8 mm or more.

3) A heat exchanger with a thermal storage function according to par. 1), wherein an outer circumferential surface of that cylindrical portion of the thermal storage material charging member which resides within the cylindrical hole, and an outer circumferential surface of the cylindrical uncrushed portion are continuous through a taper portion whose diameter gradually increases toward an outer end of the thermal storage material charging member.

4) A heat exchanger with a thermal storage function according to par. 1), wherein the thermal storage material charging member is formed entirely of a metal bare material.

5) A heat exchanger with a thermal storage function according to par. 1), wherein a plurality of flat heat exchanger tubes are disposed in parallel at intervals in their thickness direction such that they are longitudinally oriented in the same direction, their width direction coincides with an air-passing direction, and clearances are formed between the adjacent heat exchanger tubes; the thermal storage material containers are disposed in at least some of the clearances, respectively, and outer fins are disposed in the remaining clearances, respectively; and an outside diameter of that cylindrical portion of the thermal storage material charging member which resides within the cylindrical hole is equal to or smaller than a dimension, along the thickness direction of the heat exchanger tube, of each of the clearances in which the respective thermal storage material containers are disposed.

6) A heat exchanger with a thermal storage function according to par. 5), wherein the heat exchanger with a thermal storage function is used as an evaporator with a thermal storage function such that a medium for conveying the cool flows through the heat exchanger tubes, a thermal storage material for storing the cool is contained in the thermal storage material containers, and the thermal storage material in the thermal storage material containers is cooled by the cool possessed by the medium flowing through the heat exchanger tubes.

7) A heat exchanger with a thermal storage function according to par. 5), wherein a medium for conveying heat flows through the heat exchanger tubes, a thermal storage material for storing heat is contained in the thermal storage material containers, and the thermal storage material in the thermal storage material containers is heated by heat possessed by the medium flowing through the heat exchanger tubes.

8) A method of manufacturing a heat exchanger with a thermal storage function according to par. 1) comprises the steps of preparing a plurality of the flat heat exchanger tubes; pressing two metal plates each formed of a brazing sheet having a core material layer, and two brazing material layers which cover respective opposite surfaces of the core material layer, so as to form an outwardly bulging portion at a portion other than the peripheral belt portion of at least one of the two metal plates, as well as semicylindrical portions at the peripheral belt portions of the two metal plates, respectively, for forming a cylindrical hole adapted to establish communication between the interior and the exterior of the thermal storage material container, thereby yielding the two container constituent plates; preparing the thermal storage material charging member which is formed of metal and is composed of a large-diameter cylindrical portion and a small-diameter cylindrical portion continuous to one end of the large-diameter cylindrical portion; whose interior assumes the form of the cylindrical thermal storage material charging passage having a fixed diameter along the entire length thereof; and which has the engagement portion at an end of the small-diameter cylindrical portion opposite the large-diameter cylindrical portion, the engagement portion expanding radially outward; fabricating a plurality of container formation assemblies, each fabricated by assembling two container constituent plates such that an opening of the outwardly bulging portion formed on at least one of the two container constituent plates faces the other container constituent plate, the small-diameter cylindrical portion of the thermal storage material charging member is located between the semicylindrical portions of the two container constituent plates, and the engagement portion is located in the outwardly bulging portion; brazing the peripheral belt portions of two container constituent plates, brazing the semicylindrical portions of the two container constituent plates and the thermal storage material charging member, and brazing the heat exchanger tubes and the container constituent plates; charging the thermal storage material into the thermal storage material containers through the thermal storage material charging passages of the thermal storage material charging members; and sealing each of the thermal storage material charging passages through formation of the crushed portion on the thermal storage material charging member such that the large-diameter cylindrical portion of the thermal storage material charging member is crushed from radially opposite sides at an outer end portion thereof to thereby deform a circumferential wall of the thermal storage material charging member.

9) A method of manufacturing a heat exchanger with a thermal storage function according to par. 8), wherein the large-diameter cylindrical portion of the thermal storage material charging member has a wall thickness of 0.8 mm or more.

10) A method of manufacturing a heat exchanger with a thermal storage function according to par. 8), wherein an outer circumferential surface of the small-diameter cylindrical portion of the thermal storage material charging member and an outer circumferential surface of the large-diameter cylindrical portion of the thermal storage material charging member are continuous through a taper portion whose diameter gradually increases toward the outer end of the thermal storage material charging member.

According to the heat exchanger with a thermal storage function of any one of pars. 1) to 7), the peripheral belt portions of the two container constituent plates of each of the thermal storage material containers are deformed outward to thereby form a cylindrical hole between the peripheral belt portions for allowing the thermal storage material containing space to communicate with the exterior thereof, and a portion located toward one longitudinal end of a thermal storage material charging member formed of metal and having a thermal storage material charging passage therein is disposed within the cylindrical hole and is brazed to the two container constituent plates of the thermal storage material container; that portion of the thermal storage material charging member which resides within the cylindrical hole is cylindrical; that portion of the thermal storage material charging member which protrudes outward from the cylindrical hole is crushed from radially opposite sides at an outer end portion thereof, whereby a circumferential wall of the thermal storage material charging member is deformed to thereby form a crushed portion on the thermal storage material charging member for sealing the thermal storage material charging passage; a cylindrical uncrushed portion is that portion of the thermal storage material charging member which protrudes outward from the cylindrical hole, excludes the crushed portion, and is located toward the thermal storage material container; that cylindrical portion of the thermal storage material charging member which resides within the cylindrical hole is smaller in outside diameter than the cylindrical uncrushed portion; the cylindrical portion is equal in inside diameter to the cylindrical uncrushed portion; the thermal storage material charging member has, at an inner end portion, an inward protrusion protruding into the thermal storage material containing space; and the inward protrusion has an engagement portion which expands radially outward. Thus, as compared with the case where a circular columnar plug is press-fitted into the cylindrical hole, leakage of the thermal storage material contained in the thermal storage material container can be reliably prevented. Also, there is no need to prepare a plug as a separate member. Additionally, leakage of the thermal storage material from the thermal storage material container can be prevented without need to provide a seal at a distal end portion of the thermal storage material charging member by welding or bonding. Furthermore, in manufacture of the heat exchanger with a thermal storage function by the method of par. 8), in the step of brazing the peripheral belt portions of two container constituent plates, brazing the semicylindrical portions of the two container constituent plates and the thermal storage material charging member, and brazing the heat exchanger tubes and the container constituent plates, there can be prevented an inward or outward positional shift of the thermal storage material charging member from the two container constituent plates.

According to the heat exchanger with a thermal storage function of par. 2), in manufacture of the heat exchanger with a thermal storage function by the method of par. 8), the crushed portion can be formed relatively easily, whereby the thermal storage material charging passage can be sealed.

According to the heat exchanger with a thermal storage function of par. 3), an annular groove is formed between the taper portion of the outer circumferential surface of the thermal storage material charging member and a peripheral portion around the outer end opening of the cylindrical hole formed at the peripheral belt portions of the thermal storage material container, whereby a brazing material is easily collected in the annular groove.

According to the manufacturing method of par. 8), in the step of brazing the peripheral belt portions of two container constituent plates, brazing the semicylindrical portions of the two container constituent plates and the thermal storage material charging member, and brazing the heat exchanger tubes and the container constituent plates, there can be prevented an inward or outward positional shift of the thermal storage material charging member from the two container constituent plates.

At each of the crushed portions of the thermal storage material charging members of the manufactured heat exchanger with a thermal storage function, adhesion improves between two deformed portions which are portions of a deformed circumferential wall of the thermal storage material charging member, whereby there can be effectively prevented leakage of the thermal storage material contained in the thermal storage material container. Particularly, since the deformation of a circumferential wall of the thermal storage material charging member is accompanied by extension of material, an oxide film on the surface of material may be destroyed, potentially resulting in appearance of a bare surface. Accordingly, the two deformed portions in close contact with each other are brought, at least partially, in pressure contact with each other, whereby adhesion improves between the two deformed portions which are portions of a deformed circumferential wall of the thermal storage material charging member.

According to the manufacturing method of par. 9), the crushed portion can be formed relatively easily, whereby the thermal storage material charging passage can be sealed.

According to the manufacturing method of par. 10), in the step of brazing the peripheral belt portions of two container constituent plates, brazing the semicylindrical portions of the two container constituent plates and the thermal storage material charging member, and brazing the heat exchanger tubes and the container constituent plates, a molten brazing material is easily collected in the annular groove formed between the taper portion of the outer circumferential surface of the thermal storage material charging member and a peripheral portion around the outer end opening of the cylindrical hole formed at the peripheral belt portions of the thermal storage material container, whereby brazability improves.

DESCRIPTION OF THE PREFERRED EMBODIMENT

An embodiment of the present invention will next be described with reference to the drawings. The present embodiment is an application of a heat exchanger with a thermal storage function according to the present invention to an evaporator with a cool storage function.

In the following description, the downstream side with respect to an air-passing direction (a direction represented by arrow X in FIGS. 1 and 2) will be referred to as the "front," and the opposite side as the "rear." Accordingly, the upper, lower, left-hand, and right-hand sides of an evaporator as viewed rearward from the front side correspond to the upper, lower, left-hand, and right-hand sides of FIG. 1.

Furthermore, the term "aluminum" as used in the following description encompasses aluminum alloys in addition to pure aluminum.

Figure 1:
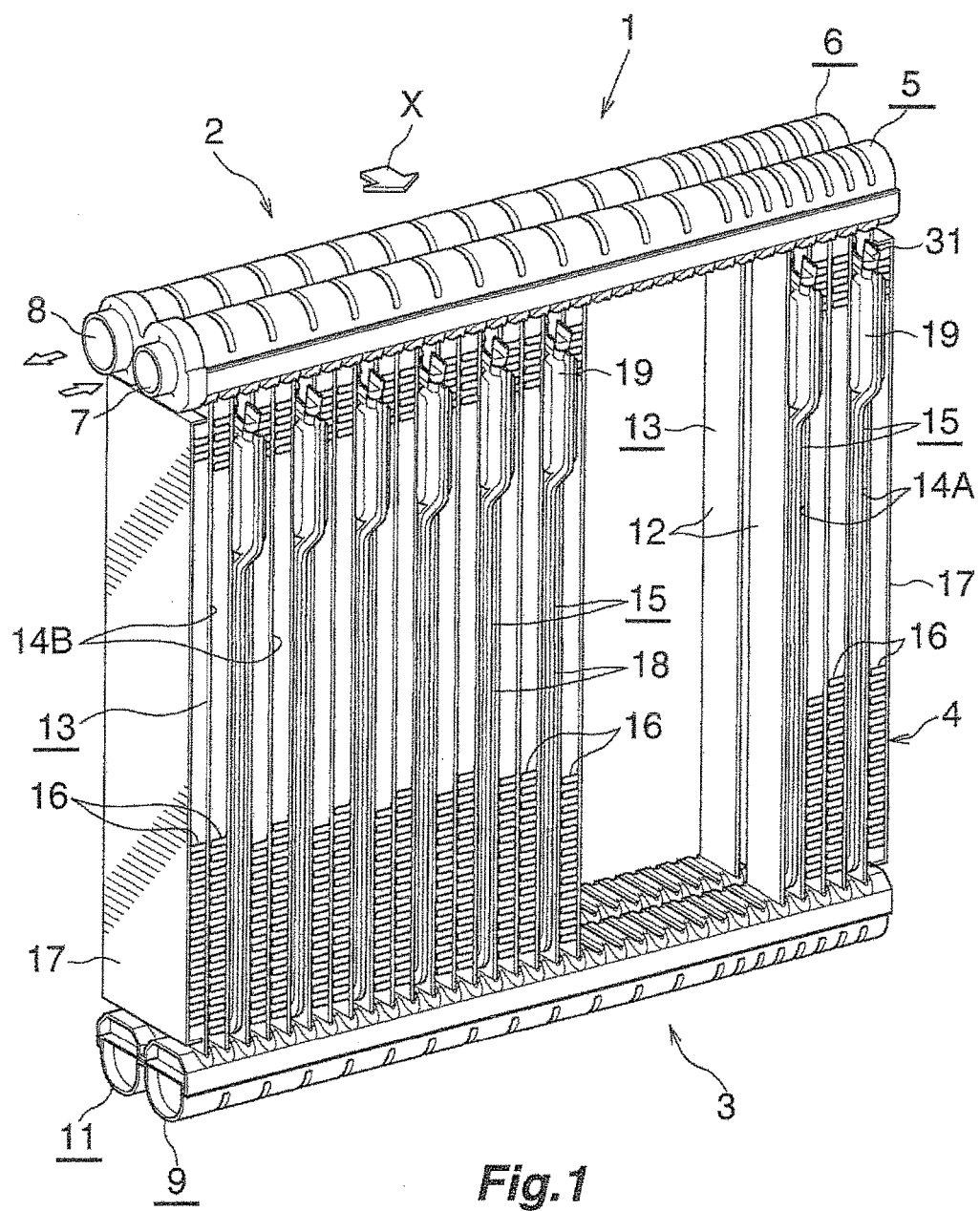
FIG. 1 is a partially eliminated perspective view showing the overall structure of an evaporator with a cool storage function to which a heat exchanger with a thermal storage function according to the present invention is applied.
Figure 2:
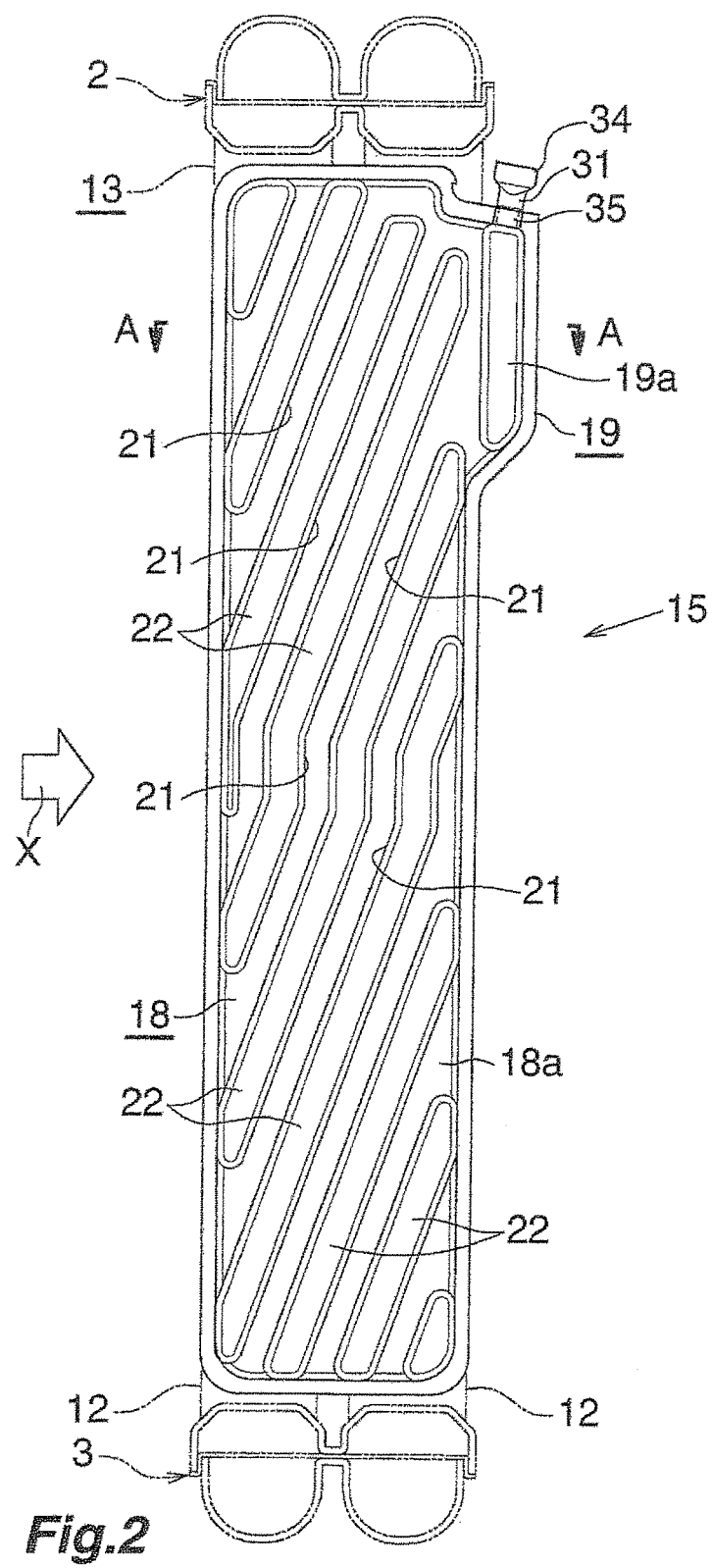
FIG. 2 is a left side view of a cool storage material container used in the evaporator with a cool storage function of FIG. 1.
Figure 3:
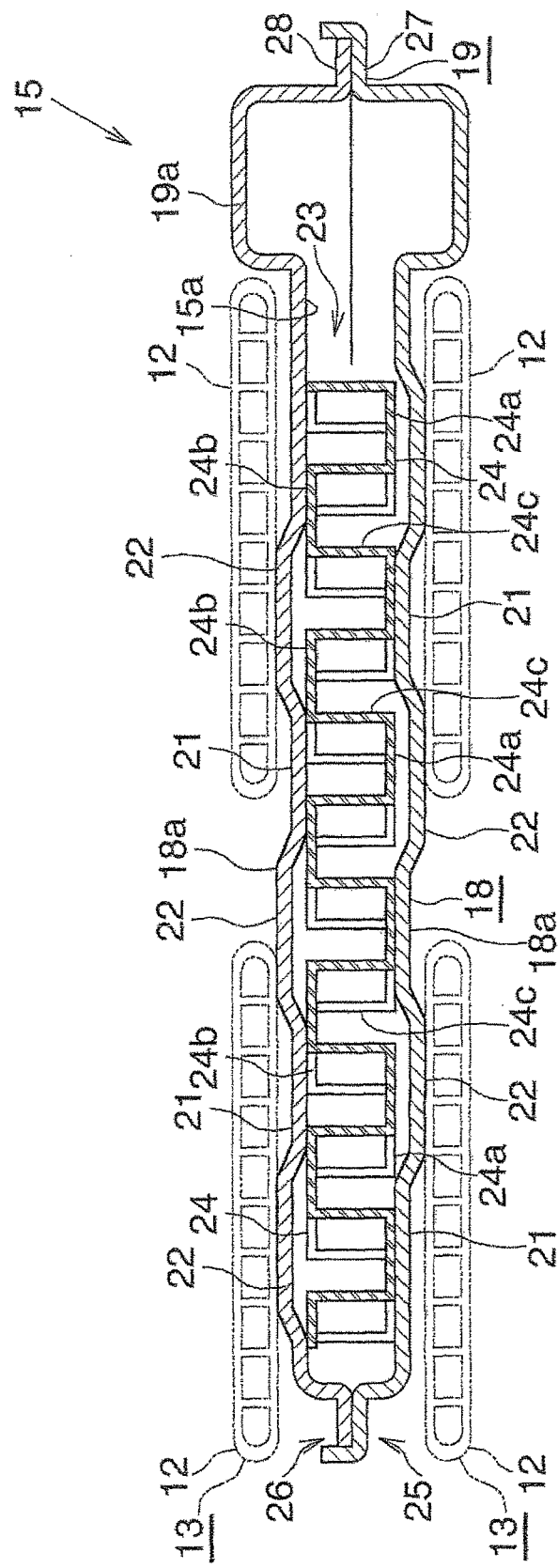
FIG. 3 is an enlarged sectional view taken along line A-A of FIG. 2.
Figure 4:
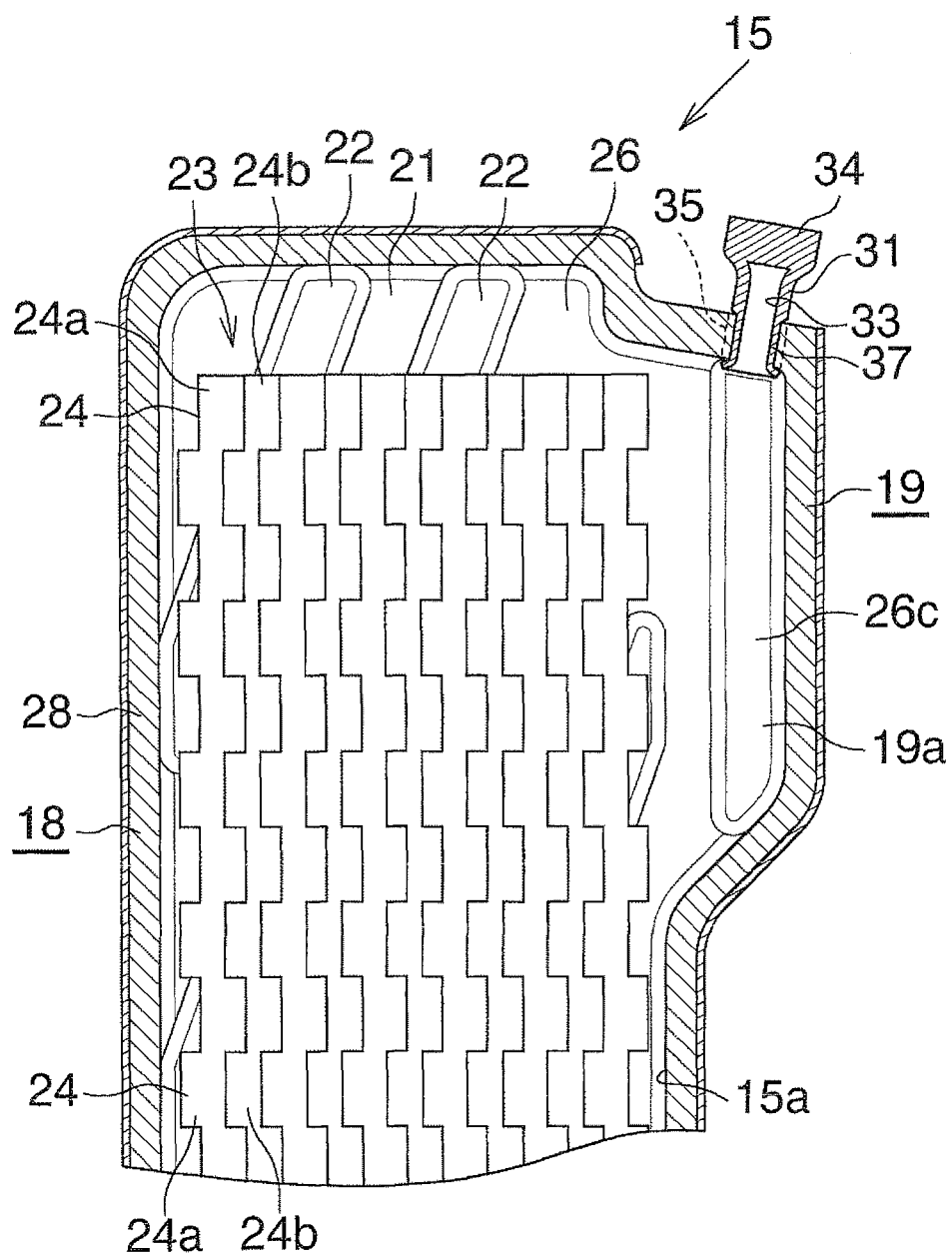
FIG. 4 is a view corresponding to a portion of FIG. 3 and showing an upper portion of a cool storage material container used in the evaporator with a cool storage function of FIG. 1, with a container constituent plate on the left side being cut and removed.
Figure 8:
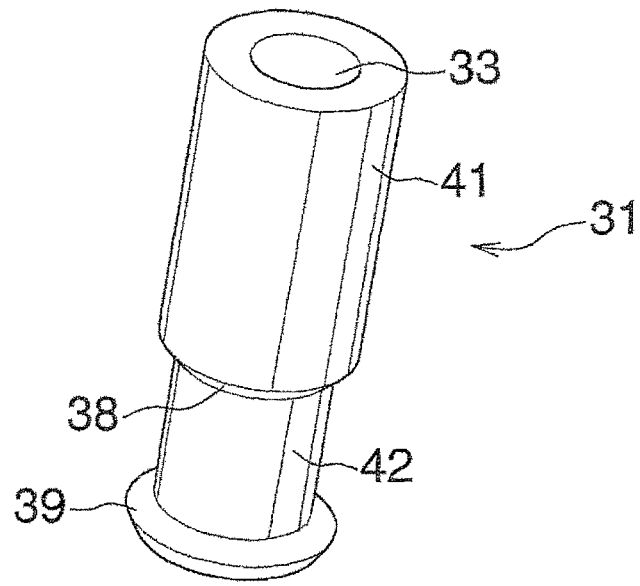
FIG. 8 is a perspective view showing a thermal storage material charging member, in a condition before crushing, for use in the evaporator with a cool storage function of FIG. 1.
Figure 9:
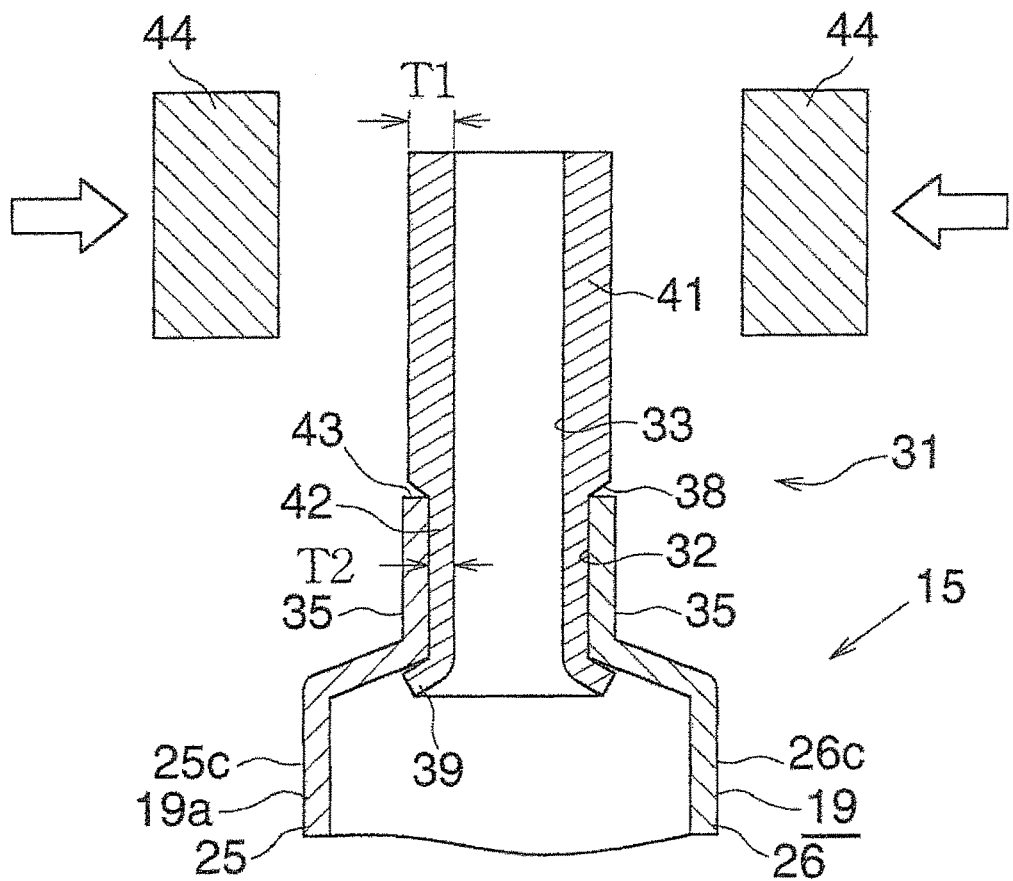
FIG. 9 is a vertical sectional view showing a method of crushing the cool storage material charging member shown in FIG. 8.

FIG. 1 shows the overall configuration of an evaporator with a cool storage function according to the present invention, and FIGS. 2 to 7 show the configuration of essential portions of the evaporator. FIG. 8 shows a condition of a cool storage material charging member before the member is crushed, and FIG. 9 shows a method of crushing the cool storage material charging member shown in FIG. 8.

As shown in FIG. 1, an evaporator with a cool storage function 1 includes a first header tank 2 and a second header tank 3 formed of aluminum and disposed apart from each other in the vertical direction such that they extend in the left-right direction; and a heat exchange core section 4 provided between the two header tanks 2 and 3.

The first header tank 2 includes a leeward upper header section 5 located on the front side (downstream side with respect to the air-passing direction); and a windward upper header section 6 located on the rear side (upstream side with respect to the air-passing direction) and united with the leeward upper header section 5. A refrigerant inlet 7 is provided at the left end of the leeward upper header section 5, and a refrigerant outlet 8 is provided at the left end of the windward upper header section 6. The second header tank 3 includes a leeward lower header section 9 located on the front side, and a windward lower header section 11 located on the rear side and united with the leeward lower header section 9.

In the heat exchange core section 4, a plurality of flat heat exchanger tubes 12 which extend in the vertical direction, whose width direction coincides with the air-passing direction (the front-rear direction), and which are formed of aluminum are disposed in parallel such that they are spaced from one another in the left-right direction (the thickness direction of the heat exchanger tubes 12). In the present embodiment, a plurality of pairs 13 each composed of two heat exchanger tubes 12 spaced from each other in the front-rear direction are disposed at predetermined intervals in the left-right direction. A clearance 14A or 14B is formed between adjacent two of the pairs 13 each composed of the front and rear heat exchanger tubes 12. An upper end portion of each front heat exchanger tube 12 is connected to the leeward upper header section 5, and a lower end portion of each front heat exchanger tube 12 is connected to the leeward lower header section 9. Similarly, an upper end portion of each rear heat exchanger tube 12 is connected to the windward upper header section 6, and a lower end portion of each rear heat exchanger tube 12 is connected to the windward lower header section 11.

A cool storage material container (thermal storage material container) 15 which is formed of aluminum and which is filled with a cool storage material (thermal storage material; not shown) is disposed in each of clearances 14A selected from all the clearances 14A and 14B of the heat exchange core section 4, the selected clearances 14A being not adjacent to one another, such that the cool storage material container 15 extends over the front and rear heat exchanger tubes 12 and are brazed to the heat exchanger tubes 12.

A corrugated outer fin 16, which is formed from an aluminum brazing sheet having a brazing material layer on each of opposite surfaces thereof and which has crest portions extending in the front-rear direction, trough portions extending in the front-rear direction, and connection portions connecting the crest portions and the trough portions, is disposed in each of the remaining clearances 14B such that the corrugated outer fin 16 extends over the front and rear heat exchanger tubes 12, and is brazed to the front and rear heat exchanger tubes 12 of the left-side and right-side pairs 13 which define the clearance 14B. Each of the connection portions of the outer fin 16 has a plurality of louvers (not shown) extending in the left-right direction and disposed side by side in the front-rear direction. In the present embodiment, one outer fin 16 is disposed in each of the clearances 14B adjacently located on the left and right sides of the clearance 14A in which the cool storage material container 15 is disposed. A plurality of, two in the present embodiment, outer fins 16 are disposed between the cool storage material containers 15 located adjacent to each other in the left-right direction. Notably, the number of the outer fins 16 disposed between the cool storage material containers 15 located adjacent to each other in the left-right direction is not limited to two, but may be three or more. Also, the outer fin 16, which is formed from an aluminum brazing sheet having a brazing material layer on each of opposite surfaces thereof, is disposed on the outer side of the pair 13 of the heat exchanger tubes 12 located at the left end, and is disposed on the outer side of the pair 13 of the heat exchanger tubes 12 located at the right end. These outer fins 16 are brazed to the corresponding front and rear heat exchanger tubes 12. Furthermore, a side plate 17 formed of aluminum is disposed on the outer side of each of the outer fins 16 located at the left and right ends, respectively, and is brazed to the corresponding outer fin 16.

In the case of the evaporator 1 of the present embodiment, refrigerant passes through the refrigerant inlet 7, enters the leeward upper header section 5 of the evaporator 1, and passes through all the heat exchanger tubes 12. The refrigerant then flows out from the refrigerant outlet 8 of the windward upper header section 6.

As shown in FIGS. 2 to 5, each cool storage material container 15 is a flat, hollow container disposed such that its longitudinal direction coincides with the vertical direction, and its widthwise direction coincides with the front-rear direction. Each cool storage material container 15 is composed of a container main body portion 18 and an outward projecting portion 19. The container main body portion 18 is located rearward of the front edges of the front heat exchanger tubes 12, and is brazed to the front and rear (two) heat exchanger tubes 12 of each of the corresponding pairs 13. The outward projecting portion 19 is continuous with only a portion (an upper portion in the present embodiment) of the front edge (leeward edge) of the container main body portion 18, and projects forward (outward in the air-passing direction) beyond the front edges of the front heat exchanger tubes 12. A cool storage material containing space 15a is formed in the cool storage material container 15, excluding a peripheral edge portion thereof, such that the cool storage material containing space extends across the container main body portion 18 and the outward projecting portion 19. The outward projecting portion 19 is provided over a predetermined length as measured from the upper end of the front edge of the container main body portion 18, and the length of the outward projecting portion 19 in the vertical direction is shorter than that of the container main body portion 18.

A plurality of condensed water drain passages 21 are formed on the outer surfaces of left and right side walls 18a of the container main body portion 18 of each cool storage material container 15 such that they open at their upper and lower ends and extend obliquely from their upper ends toward their lower ends. Each condensed water drain passage 21 is formed between two convex portions 22 bulging outward from each of the left and right side walls 18a of the container main body portion 18 of each cool storage material container 15. Two adjacent condensed water drain passages 21 share a convex portion 22 located between the two condensed water drain passages 21. The bulging top walls of all the convex portions 22 are flat and are located on the same plane. The flat bulging top walls of the convex portions 22 are in contact with and are brazed to the corresponding heat exchanger tube 12. The condensed water drain passages 21 and the convex portions 22 of the left side wall 18a of the container main body portion 18 are slightly shifted, as viewed from the left-right direction, in the air-passing direction from those of the right side wall 18a of the container main body portion 18 such that the condensed water drain passages 21 and the convex portions 22 of the left side wall 18a of the container main body portion 18 partially overlap (i.e., do not completely overlap) with those of the right side wall 18a thereof.

A staggered inner fin 23 formed of aluminum is disposed in the container main body portion 18 of each cool storage material container 15 such that the inner fin 23 extends over substantially the entire container main body portion 18 in the vertical direction. The inner fin 23 is formed by connecting together a plurality of wavy strips 24 disposed in parallel in the vertical direction. Each of the wavy strips 24 has crest portions 24a extending in the vertical direction, trough portions 24b extending in the vertical direction, and connection portions 24c connecting the crest portions 24a and the trough portions 24b. The wavy strips 24 are disposed such that the crest portions 24a and the trough portions 24b of one of two wavy strips 24 located adjacent to each other in the vertical direction are positionally shifted in the front-rear direction from the crest portions 24a and the trough portions 24b of the other wavy strip 24. In the wavy strips 24, the crest portions 24a, the trough portions 24b, and the connection portions 24c have the same vertical length. The inner fin 23 is brazed to the inner surfaces of the left and right side walls 18a of the container main body portion 18 of each cool storage material container 15; i.e., portions of the left and right side walls 18a of the container main body portion 18 where the convex portions 22 are not formed. The bulging top walls of the convex portions 22 are not in contact with the inner fin 23 although the bulging top walls are in contact with the heat exchanger tubes 12. Therefore, each side wall 18a of the container main body portion 18 of each cool storage material container 15 has contact portions which are in contact with the inner fin 23 and non-contact portions which are not in contact with the inner fin 23.

The outward projecting portion 19 of each cool storage material container 15 has an expansion portion 19a which expands in the left and right directions and whose dimension in the left-right direction is greater than that of the container main body portion 18. The expansion portion 19a is located outward of the outer fins 16 with respect to the air-passing direction (on the downstream side in the air-passing direction).

Figure 5:
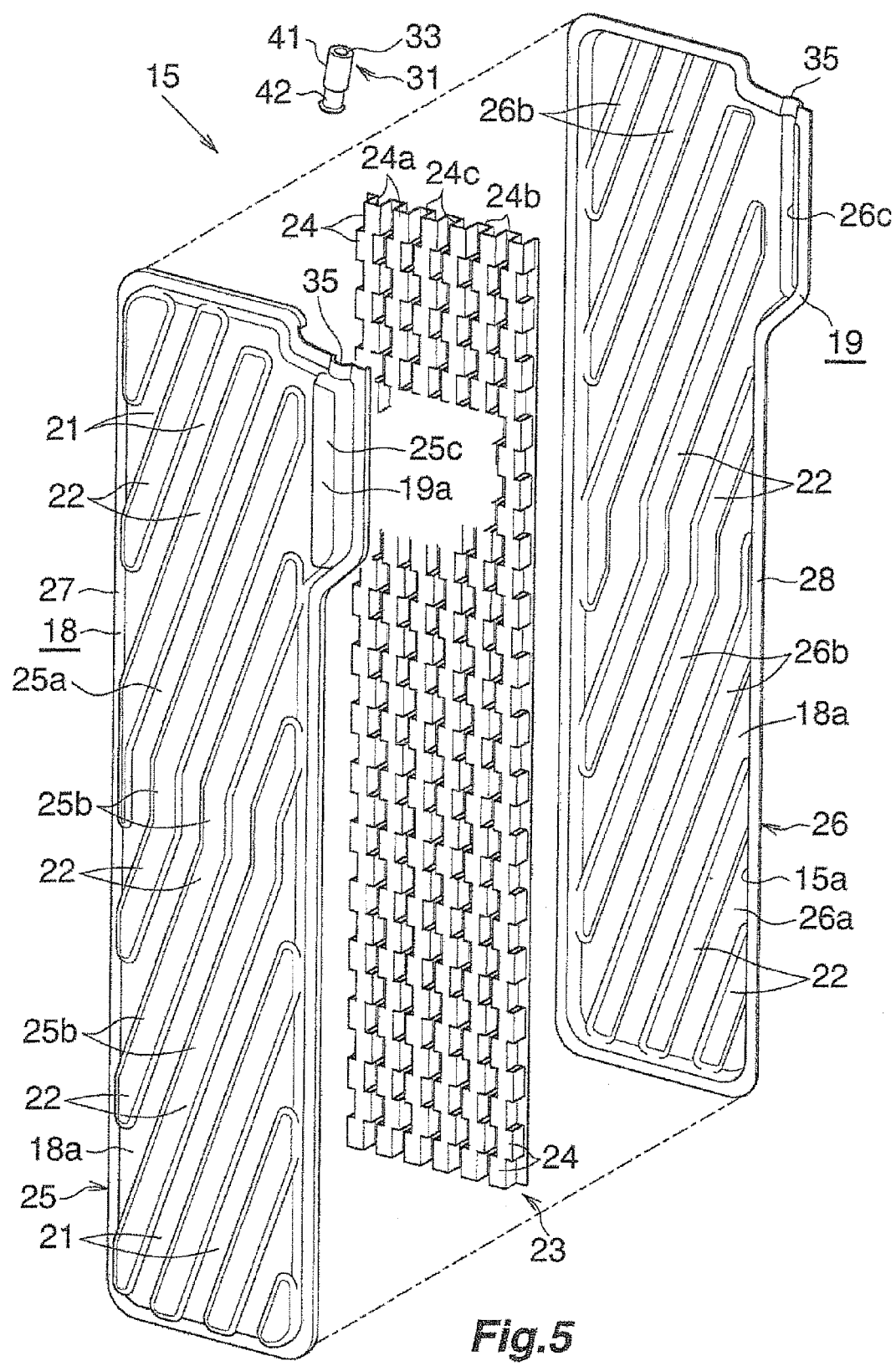
FIG. 5 is an exploded perspective view of the cool storage material container used in the evaporator with a cool storage function of FIG. 1.

As shown in detail in FIG. 5, the cool storage material container 15 is composed of two vertically elongated substantially rectangular container constituent plates 25 and 26 formed of aluminum. Each of the container constituent plates 25 and 26 is formed by pressing an aluminum brazing sheet having a brazing material layer on each of opposite surfaces thereof. The container constituent plates 25 and 26 are brazed together at their peripheral belt portions 27 and 28. The container constituent plates 25 and 26 have first bulging portions 25a and 26a, second bulging portions 25b and 26b, and third bulging portions 25c and 26c, respectively. The first bulging portions 25a and 26a are those portions other than the peripheral belt portions 27 and 28 of the container constituent plates 25 and 26, respectively, which bulge outward, have the same bulging height over the entirety thereof, and form the container main body portion 18 and the outward projecting portion 19. The second bulging portions 25b and 26b are formed on the bulging top walls of those portions of the first bulging portions 25a and 26a which form the container main body portion 18, to thereby form the respective convex portions 22. The third bulging portions 25c and 26c are formed on the bulging top walls of those portions of the first bulging portions 25a and 26a which form the outward projecting portion 19, to thereby form the expansion portion 19a.

A paraffin-based latent heat storage material whose freezing is adjusted to about 5° C. to 10° C. is used as a cool storage material which is charged into each cool storage material container 15. Specifically, pentadecane, tetradecane, or the like is used. Preferably, a cool storage material charging ratio (the ratio of the volume of the charged cool storage material to the volume of the cool storage material containing space 15a of the cool storage material container 15) is set to 70% to 90%. Preferably, the upper end of the inner fin 23 is located higher than the upper end of the cool storage material contained in the cool storage material container 15. In this case, at both of the time of storing the cool in the cool storage material and the time of releasing the stored cool from the cool storage material, the cool storage material is in contact with the inner fin 23 at all times.

Figure 6:
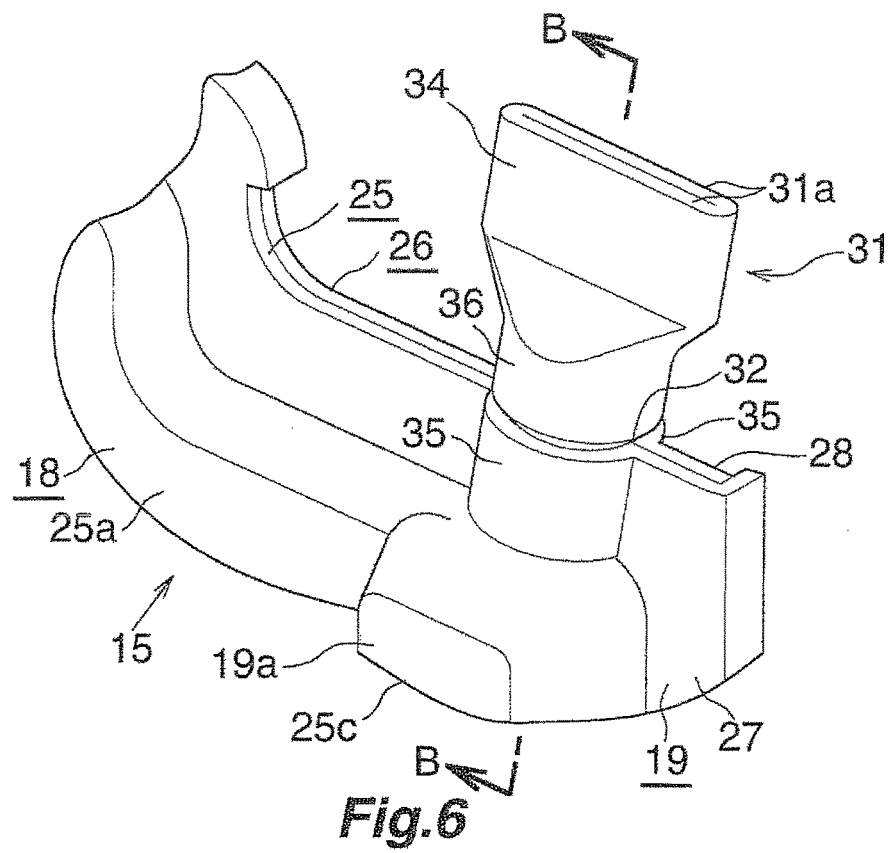
FIG. 6 is an enlarged perspective view showing essential portions of the cool storage material container for use in the evaporator with a cool storage function of FIG. 1.
Figure 7:
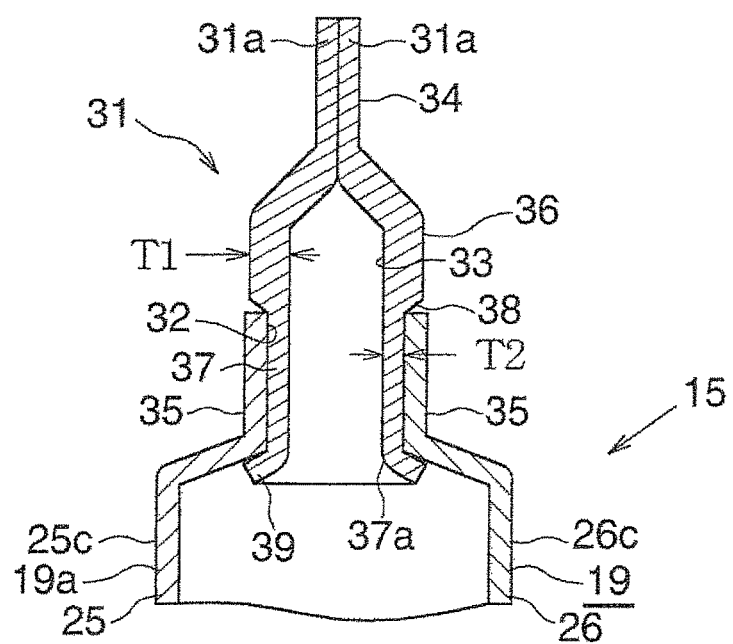
FIG. 7 is an enlarged sectional view taken along line B-B of FIG. 6.

As shown in FIGS. 6 and 7, a cool storage material charging member 31 (thermal storage material charging member) is fixed to an upper end portion of the outward projecting portion 19 of the cool storage material container 15. The cool storage material is charged into the cool storage material containing space 15a through the cool storage material charging member 31. After the cool storage material is charged into the cool storage material containing space 15a, the cool storage material charging member 31 is sealed. Specifically, a cylindrical hole 32 for establishing communication between the interior and the exterior of the cool storage material container 15 is formed between the peripheral belt portions 27 and 28 of the two container constituent plates 25 and 26 of the cool storage material container 15 by partially deforming the peripheral belt portions 27 and 28 into respective semicylindrical shapes. A portion located toward one longitudinal end of the cool storage material charging member 31 formed of an aluminum bare material and having a cool storage material charging passage 33 therein is disposed within the cylindrical hole 32 and is brazed to the two container constituent plates 25 and 26. That portion of the cool storage material charging member 31 which protrudes outward from the cylindrical hole 32 is crushed from radially opposite sides at an outer end portion thereof, whereby the circumferential wall of the cool storage material charging member 31 is deformed to thereby form a crushed portion 34 on the cool storage material charging member 31 for sealing the cool storage material charging passage 33. At the crushed portion 34 of the cool storage material charging member 31, two deformed portions 31a which are portions of a deformed circumferential wall of the cool storage material charging member 31 are in close contact with each other. Reference numeral 35 denotes the semicylindrical portions which, in cooperation with each other, form the cylindrical hole 32 at the peripheral belt portions 27 and 28 of the two container constituent plates 25 and 26. FIG. 5 shows the cool material storage material charging member 31 in a condition before the crushed portion 34 is formed.

A cylindrical uncrushed portion 36 is that portion of the cool storage material charging member 31 which protrudes outward from the cylindrical hole 32, excludes the crushed portion 34, and is located toward the cool storage material container 15. Preferably, the cylindrical uncrushed portion 36 has a wall thickness T1 of 0.8 mm or more. Preferably, the upper limit of the wall thickness T1 of the cylindrical uncrushed portion 34 is about 1.5 mm. That portion of the cool storage material charging member 31 which resides within the cylindrical hole 32 is cylindrical; the cylindrical portion 37 is smaller in outside diameter than the cylindrical uncrushed portion 36; and the cylindrical portion 37 is equal in inside diameter to the cylindrical uncrushed portion 36. Accordingly, a wall thickness T2 of the cylindrical portion 37 of the cool storage material charging member 31 is smaller than the wall thickness T1 of the cylindrical uncrushed portion 36. The outer circumferential surface of that cylindrical portion 37 of the cool storage material charging member 31 which resides within the cylindrical hole 32, and the outer circumferential surface of the cylindrical uncrushed portion 34 are continuous through a taper portion 38 whose diameter gradually increases toward the outer end of the cool storage material charging member 31. Also, the cool storage material charging member 31 has, at an inner end portion of the cylindrical portion 37, an inward protrusion 37a protruding into the cool storage material containing space 15a. The inward protrusion 37a has an engagement portion 39 which expands radially outward to thereby be engaged with peripheral portions around the inner end opening of the cylindrical hole 32 of the two container constituent plates 25 and 26. Furthermore, preferably, the outside diameter of the cylindrical portion 37 of the cool storage material charging member 31 is equal to or smaller than a dimension, along the thickness direction (left-right direction) of the heat exchanger tube 12, of the clearance 14A in which the cool storage material container 15 is disposed.

The above-described evaporator 1 with a cool storage function constitutes a refrigeration cycle in combination with a compressor driven by an engine of a vehicle, a condenser (refrigerant cooler) for cooling the refrigerant discharged from the compressor, and an expansion valve (pressure-reducing unit) for reducing the pressure of the refrigerant having passed through the condenser. The refrigeration cycle is installed, as a car air conditioner, in a vehicle, such as an automobile, which temporarily stops the engine, which serves as a drive source of the compressor, when the vehicle is stopped. When the compressor is operating, low pressure, two-phase refrigerant (a mixture of vapor refrigerant and liquid refrigerant) having been compressed by the compressor and having passed through the condenser and the expansion valve passes through the refrigerant inlet 7, and enters the leeward upper header section 5 of the evaporator 1. The refrigerant then passes through all the front heat exchanger tubes 12, and flows out from the refrigerant outlet 8 of the windward upper header section 6. When the refrigerant flows through the heat exchanger tubes 12, the refrigerant performs heat exchange with air passing through the clearances 14B, and flows out in a vapor phase.

When the compressor is operating, the cool carried by the refrigerant flowing through the heat exchanger tubes 12 is transferred directly to the cool storage material within each cool storage material container 15 from the bulging top walls of the convex portions 22 of the left and right side walls 18a of the container main body portion 18 of the cool storage material container 15, the bulging top walls being brazed to the corresponding heat exchanger tubes 12. Also, the cool is transferred from the bulging top walls of the convex portions 22 to the entire cool storage material within the cool storage material container 15 through the inner fin 23 and portions of the left and right side walls 18a, which portions are not brazed to the heat exchanger tubes 12. Thus, the cool is stored in the cool storage material.

Also, when the compressor is operating, condensed water is produced on the surface of each cool storage material container 15. The condensed water enters the condensed water drain passages 21, and, due to surface tension, accumulates within the condensed water drain passages 21, along the convex portions 22 on the opposite sides of the condensed water drain passages 21. When the amount of the condensed water accumulated within the condensed water drain passages 21 increases, the gravitational force acting on the accumulated, condensed water becomes greater than the surface tension, and the accumulated, condensed water flows downward through the condensed water drain passages 21 to thereby be drained downward.

When the compressor stops, the cool stored in the cool storage material within each cool storage material container 15 is transferred directly to the heat exchanger tubes 12 from the bulging top walls of the convex portions 22 of the left and right side walls 18a of the container main body portion 18 of the cool storage material container 15, the bulging top walls being brazed to the corresponding heat exchanger tubes 12. The stored cool is also transferred from the inner fin 23 to the heat exchanger tubes 12 through the portions of the left and right side walls 18a, which portions are not brazed to the heat exchanger tubes 12, and the bulging top walls of the convex portions 22. The cool then passes through the heat exchanger tubes 12 and propagates to the outer fins 16 brazed to the sides of the heat exchanger tubes 12 opposite the cool storage material container 15. Subsequently, the cool is transferred via the outer fins 16 to air passing through the clearances 14B adjacently located on the opposite sides of the clearance 14A in which the cool storage material container 15 is disposed. Accordingly, even when the temperature of air having passed through the evaporator 1 increases, the air is cooled, so that a sharp drop in the cooling capacity can be prevented.

Next, a method of manufacturing the above-described evaporator 1 with a cool storage function will be described with reference to FIGS. 8 and 9.

There are prepared components of the two header tanks 2 and 3, the heat exchanger tubes 12, the outer fins 16, the side plates 17, and the inner fins 23.

Pressing is performed on two metal blank plates each formed of a brazing sheet having a core material layer, and two brazing material layers which cover respective opposite surfaces of the core material layer, thereby forming the container constituent plates 25 and 26 having the first to third bulging portions 25a and 26a, 25b and 26b, and 25c and 26c, the peripheral belt portions 27 and 28, and the semicylindrical portions 35.

Furthermore, there is prepared the cool storage material charging member 31 which is formed of an aluminum bare material and is composed of a large-diameter cylindrical portion 41 and a small-diameter cylindrical portion 42 continuous to one end of the large-diameter cylindrical portion 41, and whose interior assumes the form of the cylindrical cool storage material charging passage 33 having a fixed diameter along the entire length thereof. The cool storage material charging member 31 has the engagement portion 39 at an end of the small-diameter cylindrical portion 42 opposite the large-diameter cylindrical portion 41, the engagement portion 39 expanding radially outward. Preferably, the large-diameter cylindrical portion 41 of the cool storage material charging member 31 has a wall thickness T1 of 0.8 mm or more. Preferably, the upper limit of the wall thickness T1 of the large-diameter cylindrical portion 41 is about 1.5 mm. The wall thickness T2 of the small-diameter cylindrical portion 42 of the cool storage material charging member 31 is smaller than the wall thickness T1 of the large-diameter cylindrical portion 41. Also, the outer circumferential surface of the small-diameter cylindrical portion 42 of the cool storage material charging member 31 and the outer circumferential surface of the large-diameter portion 41 are continuous through the taper portion 38 whose diameter gradually increases toward the outer end of the cool storage material charging member 31.

Then, a plurality of container formation assemblies are fabricated as follows: each container formation assembly is fabricated by assembling two container constituent plates 25 and 26, with the inner fin 23 disposed therebetween, such that the openings of the first bulging portions 25a and 26a of the two container constituent plates 25 and 26 face each other, the small-diameter cylindrical portion 42 of the cool storage material charging member 31 is located between the semicylindrical portions 35 of the two container constituent plates 25 and 26, and the engagement portion 39 is located in the third bulging portions 25c and 26c (see FIGS. 9 and 5).

Then, the container formation assemblies, the components of the two header tanks 2 and 3, the heat exchanger tubes 12, the outer fins 16, and the side plates 17 are assembled and temporarily fixed together. Brazing is performed at a time, whereby each cool storage material container 15 is formed through brazing of the peripheral belt portions 27 and 28 of two container constituent plates 25 and 26, brazing of the cool storage material charging member 31 and the semicylindrical portions 35 of the two container constituent plates 25 and 26, and brazing of the two container constituent plates 25 and 26 and the inner fin 23; at the same time, the container constituent plates 25 and 26 and the heat exchanger tubes 12 are brazed, and other components are brazed. During the above-mentioned brazing process, a molten brazing material flows into and is retained in an annular groove 43 formed between the taper portion 38 of the cool storage material charging member 31 and the outer end surfaces of the semicylindrical portions 35 of the two container constituent plates 25 and 26, whereby excellent brazability is attained between the cool storage material charging member 31 and the semicylindrical portions 35 of the two container constituent plates 25 and 26.

Subsequently, a cool storage material is charged into each cool storage material container 15 through the cool storage material charging passage 33 of the cool storage material charging member 31. Then, by use of two pressing dies 44, that portion of the cool storage material charging member 31 which protrudes outward from the cylindrical hole 32 of the cool storage material container 15 is crushed, at a distal end portion thereof, from opposite sides with respect to the thickness direction of the container constituent plates 25 and 26; i.e., from radially opposite sides, whereby a circumferential wall of the cool storage material charging member 31 is deformed. This pressing process forms the crushed portion 34 such that the deformed portions 31a, which partially constitute a deformed circumferential wall of the cool storage material charging member 31, are in close contact with each other, thereby sealing the cool storage material charging passage 33. In this manner, the evaporator 1 with a cool storage function is manufactured.

In the embodiment described above, the heat exchanger with a thermal storage function according to the present invention is used as an evaporator with a cool storage function. However, application of the present invention is not limited thereto. The heat exchanger with a thermal storage function may be used as a heat exchanger with a thermal storage function having a plurality of heat exchanger tubes through which a heat conveying medium flows, and a thermal storage material container(s) in which a thermal storage material for storing heat is contained.

What is claimed is:
1. A heat exchanger with a thermal storage function comprising:
   a plurality of heat exchanger tubes; and
   a plurality of thermal storage material containers which are formed of metal and in which a thermal storage material is contained, each of the thermal storage material containers comprising two container constituent plates formed of metal and joined together at their peripheral belt portions, at least one of the two container constituent plates bulging outward at a portion other than the joined peripheral belt portion to thereby form a thermal storage material containing space in each of the thermal storage material containers, and heat being transmitted to the thermal storage material contained in the thermal storage material containers from a medium flowing through the heat exchanger tubes and conveying heat, wherein
   the peripheral belt portions of the two container constituent plates of each of the thermal storage material containers are deformed outward to thereby form a cylindrical hole between the peripheral belt portions for allowing the thermal storage material containing space to communicate with the exterior thereof, and a portion of a thermal storage material charging member formed of metal and having a thermal storage material charging passage therein, the portion of the thermal storage material charging member being located toward one longitudinal end of the thermal storage material charging member, is disposed within the cylindrical hole and is brazed to the two container constituent plates of the thermal storage material container;
   that portion of the thermal storage material charging member which resides within the cylindrical hole is cylindrical; that portion of the thermal storage material charging member which protrudes outward from the cylindrical hole is crushed from radially opposite sides at an outer end portion thereof, whereby a circumferential wall of the thermal storage material charging member is deformed to thereby form a crushed portion on the thermal storage material charging member for sealing the thermal storage material charging passage; and a cylindrical uncrushed portion is that portion of the thermal storage material charging member which protrudes outward from the cylindrical hole, excludes the crushed portion, and is located toward the thermal storage material container; and
   that cylindrical portion of the thermal storage material charging member which resides within the cylindrical hole is smaller in outside diameter than the cylindrical uncrushed portion; the cylindrical portion is equal in inside diameter to the cylindrical uncrushed portion; the thermal storage material charging member has, at an inner end portion, an inward protrusion protruding into the thermal storage material containing space; and the inward protrusion has an engagement portion which expands radially outward.
2. The heat exchanger with a thermal storage function according to claim 1, wherein the cylindrical uncrushed portion of the thermal storage material charging member has a wall thickness of 0.8 mm or more.

3. The heat exchanger with a thermal storage function according to claim 1, wherein an outer circumferential surface of that cylindrical portion of the thermal storage material charging member which resides within the cylindrical hole, and an outer circumferential surface of the cylindrical uncrushed portion are continuous through a taper portion whose diameter gradually increases toward an outer end of the thermal storage material charging member.

4. The heat exchanger with a thermal storage function according to claim 1, wherein the thermal storage material charging member is formed entirely of a metal bare material.

5. The heat exchanger with a thermal storage function according to claim 1, wherein
the plurality of heat exchanger tubes comprises a plurality of flat heat exchanger tubes which are disposed in parallel at intervals in an arranging direction, a width direction of the flat heat exchanger tubes which is perpendicular to the arranging direction coincides with an air-passing direction, and clearances are formed between the adjacent flat heat exchanger tubes;
the thermal storage material containers are disposed in at least some of the clearances, respectively, and outer fins are disposed in the remaining clearances, respectively; and
an outside diameter of that cylindrical portion of the thermal storage material charging member which resides within the cylindrical hole is equal to or smaller than a dimension, along the arranging direction of the flat heat exchanger tubes, of each of the clearances in which the respective thermal storage material containers are disposed.

6. The heat exchanger with a thermal storage function according to claim 5, wherein the heat exchanger with a thermal storage function is used as an evaporator with a thermal storage function such that
the medium for conveying the cool flows through the heat exchanger tubes;
the thermal storage material is contained in the thermal storage material containers; and
the thermal storage material in the thermal storage material containers is cooled by the medium flowing through the heat exchanger tubes.

7. The heat exchanger with a thermal storage function according to claim 5, wherein
the medium for conveying heat flows through the heat exchanger tubes;
the thermal storage material for storing heat is contained in the thermal storage material containers; and
the thermal storage material in the thermal storage material containers is heated by heat possessed by the medium flowing through the heat exchanger tubes.

* * * * *